United States Patent

Chmielewski et al.

[11] Patent Number: 5,828,791
[45] Date of Patent: Oct. 27, 1998

[54] METHOD FOR STORING AND PLAYBACK OF FIXED VIDEOTEXTS

[75] Inventors: Ingo Chmielewski; Detlef Räth, both of Edemissen; Eckart Neumann, Gifhorn; Christian Seydel, Osterode/Lasfelde; Rolf Michael Schuller, Peine, all of Germany

[73] Assignee: MB Video GmbH, Peine, Germany

[21] Appl. No.: 650,982

[22] Filed: May 21, 1996

[30] Foreign Application Priority Data

May 22, 1995 [DE] Germany .......................... 195 18 367.3

[51] Int. Cl.⁶ ................................ G06K 9/36; G06K 9/46
[52] U.S. Cl. .............................................. 382/244; 382/246
[58] Field of Search .................................... 382/244, 246, 382/305, 306; 348/468; 395/612, 793, 806, 350; 345/193

[56] References Cited

U.S. PATENT DOCUMENTS 5,347,632  9/1994  Filepp et al. .......................... 395/200

FOREIGN PATENT DOCUMENTS 3409 023 A1  9/1985  Germany .

OTHER PUBLICATIONS

"Audio and Video Data Compression with MPEG2", *Funkschau*, Mar. 1995, pp. 26—33.

*Primary Examiner*—Phuoc Tran
*Attorney, Agent, or Firm*—Whitham, Curtis & Whitham

[57] ABSTRACT

In a method for storing and playback of a repertoire of fixed videotexts, in which the videotext is stored by characters in digital form in an electrical memory, the quantity of the data to be stored can be effectively reduced in that in addition to the characters, position characters are stored and that for recurring, identical character sequences of greater length, instead of the character sequence, a reference to the location of the already stored character sequence is stored. The playback of the thus compressed texts can take place without problems in real time, i.e., without noticeable delay.

5 Claims, 2 Drawing Sheets

```
        SCREEN                .456........
      LINE/COLUMN      ┌─ ─ ─ ─ ─ ─ ─ ─ ─ ─ ─ ─ ─ ┐
            1         │                          │
            2         │                          │
            3         │                          │
            4         │                          │
            5         │  AUTO CLOCK SETTINGS IS FAILED │
        SCREEN         └─ ─ ─ ─ ─ ─ ─ ─ ─ ─ ─ ─ ─ ┘
      LINE/COLUMN             .456........
            1         ┌─ ─ ─ ─ ─ ─ ─ ─ ─ ─ ─ ─ ─ ┐
            2         │                          │
            3         │                          │
            4         │  MENU: AUTOMATIC SETTINGS │
            5         │  EXIT: MANUAL SETTING    │
                      └─ ─ ─ ─ ─ ─ ─ ─ ─ ─ ─ ─ ─ ┘
        SCREEN                .456........
      LINE/COLUMN      ┌─ ─ ─ ─ ─ ─ ─ ─ ─ ─ ─ ─ ─ ┐
            1         │                          │
            2         │                          │
            3         │                          │
            4         │  STORE: SETTING          │
            5         └─ ─ ─ ─ ─ ─ ─ ─ ─ ─ ─ ─ ─ ┘
```

SCREEN CONTROL CHARACTER ARRAY

```
//
(
  {ADDRESS 1.    CONTROL BITS     0 1 0 0 0      SCREEN 1
  {ADDRESS 2.         ‖           0 0 0 1 1      SCREEN 2
  {ADDRESS 3.         ‖           0 0 0 0 1      SCREEN 3
)
```

LINE CONTROL CHARACTER ARRAY

```
(
  ( SUX1 , SAY1 , SAY2 , SAY3 )         ADDRESS 1
  ( SUX2 , SAY4 , SAY2 )                ADDRESS 2
  ( SUX3 , SAY5 , SAY2 )
  ( SUX4 , SAY2 )                       ADDRESS 3
)
```

LANGUAGE-INDEPENDENT ARRAY

```
//
(
  { COLUMN 6                              SUX 1
  { COLUMN 5         "MENU" )             SUX 2
  { COLUMN 5         "EXIT" )             SUX 3
  { COLUMN 4         "STORE")             SUX 4
)
```

LANGUAGE-DEPENDENT ARRAY

```
(
  ( ENGLISH      GERMAN     FRENCH     SWEDISH )
  ("AUTO CLOCK"  , ...      , ...      , ...   ) SAY1
  ("SETTING"     , ...      , ...      , ...   ) SAY2
  ("IS FAILED"   , ...      , ...      , ...   ) SAY3
  ("AUTOMATIC"   , ...      , ...      , ...   ) SAY4
  ("MANUAL"      , ...      , ...      , ...   ) SAY5
)
```

FIG.2

METHOD FOR STORING AND PLAYBACK OF FIXED VIDEOTEXTS

BACKGROUND OF THE INVENTION

1. Field of the Invention

The invention relates to a method for storing and playback of a repertoire of fixed videotexts, in which the videotext is stored by characters in digital form in an electronic memory.

2. Description of the Related Art

For many cases of application, it is necessary or useful to generate fixed videotexts on a television screen in order, for example, to make possible a transmitter-independent operator control. Such an operator control is significant particularly for the—at times relatively complicated—operation of a video recorder or other peripheral device of a television and can advantageously be carried out on the screen itself. In this way, the otherwise existing need to produce a more or less expensive display on the peripheral device itself, in particular a video recorder, is eliminated. The operator control on the screen itself (on screen display—OSD) naturally offers the possibility to transfer a larger information content in comprehensible form.

Since the texts played back on the screen must be generated transmitter-independent, it is necessary to store these texts. Storage in typical electronic memory components sets limits on the quantity of data stored, however. Typically, letters are stored coded in 8-bit form and digitally. This results, with a maximum number of letters per screen and the maximum storage volume of a memory component, in a highest number of text screens that is, generally speaking, insufficient for comfortable operator control.

The use of conventional compression methods to reduce the data quantity to be stored is regularly out of the question, since the screens must be generated for a comfortable operator control without noticeable waiting time for the user. Modifications of the screen must take place in "real time", practically speaking. This is not possible with the decompression of conventionally compressed texts.

SUMMARY OF THE INVENTION

The invention is thus based on the technical problem of being able to store as large a text quantity as possible, in connection with which the playback of the stored videotexts must be possible practically without waiting time.

Starting with this problem, according to the invention a method of the initially mentioned type is characterized in that in addition to the characters, position characters are stored, and that for recurring, identical character sequences of greater length, instead of the character sequence a reference to the location of the already stored character sequence is stored.

The present invention is based on the knowledge that videotexts to be stored often contain repetitions and sometimes even match. Such matches can involve entire portions of the videotext, text lines, as well as certain phrases which, according to the invention, are not newly coded, but rather undergo a coding through a reference to the location at which the corresponding text portion is already stored.

The method according to the invention can be achieved in several stages which are preferably realized in combination with each other.

A substantial data reduction is achieved in that the repertoire of fixed videotexts is stored in the form of text sections, in connection with which in each case an assignment of the text sections belonging to a videotext is also stored. Suitable text sections are text lines. According to this form of execution, text lines occurring in all videotexts are thus stored and provided with a line number. A videotext no. XY is then composed from the repertoire of the stored text sections (text lines). For this, a stored assignment of the lines of this videotext to the stored lines belongs to videotext no. XY. Videotext no. XY is thus stored in the form of line control characters that refer to stored text lines. In this way, identical lines occurring in several videotexts are not stored anew, but rather are usable for the concerned videotext by reference to the stored line.

In this connection, it is advantageous that the characters of all possible fixed videotexts be stored as a text and that the references to the location of a character sequence already stored in the text are made throughout the text. This is particularly significant when not (only) identical text lines can be called up by referring to a once stored text line, but rather when identical phrases or words (e.g., "EXIT") (also) occurring in the text are stored by reference to the location at which this phrase was already stored. In this connection, the corresponding phrase is stored coded in normal form when it turns up the first time. When this phrase recurs, no new coding takes place, but rather instead of the coded phrase, the reference to the text position at which the phrase was already stored, is stored.

With this measure as well, the data to be stored can be considerably reduced without requiring a time-consuming decompression.

A further step for reducing the data quantity to be stored consists of storing, for each videotext, screen control characters that indicate which portions of the videotext differ from a possible preceding videotext and must therefore be newly written. This method for reducing the data to be stored is based on the knowledge that for an operator control with videotexts, a specific videotext (table) often must necessarily occur after another specific videotext (table). Insofar as the two videotexts match, a new writing of the subsequent videotext does not have to take place at all. For the subsequent videotext, for a generation of this text with stored lines, under certain circumstances a substantial portion of the line control characters can be dispensed with.

In particular, a combination of the aforementioned measures for data reduction makes it possible, in practical cases, to reduce by half the data to be stored, without requiring complicated, time-consuming text syntheses that could not be achieved in the desired "real time".

An additional data reduction can be achieved in that the characters are not stored in the typical form with character words of fixed bit-length, but rather according to a frequency-orientated, bit-length-variable coding. Such a coding, which takes place according to a Huffman tree produced in basically familiar manner for the case of application, provides for the characters occurring most often to be coded with the smallest bit lengths and for increasing bit-lengths to be assigned to the characters as frequency decreases. A text coding according to a Huffman tree uses character codings between 3 and 15 bits and results in an average bit-length of somewhat over 6 bits, in such a way that the data quantity is reduced to about 75%. Since text cohesion is not disturbed with such a Huffman coding, the decoding (decompression) in "real time" is easily possible.

BRIEF DESCRIPTION OF THE DRAWINGS

The present invention is to be explained in greater detail below using an example of execution shown in the drawings, in which:

FIG. 2 illustrates an example of execution for three different videotexts and the related memories.

DETAILED DESCRIPTION OF A PREFERRED EMBODIMENT OF THE INVENTION

Figure 1:
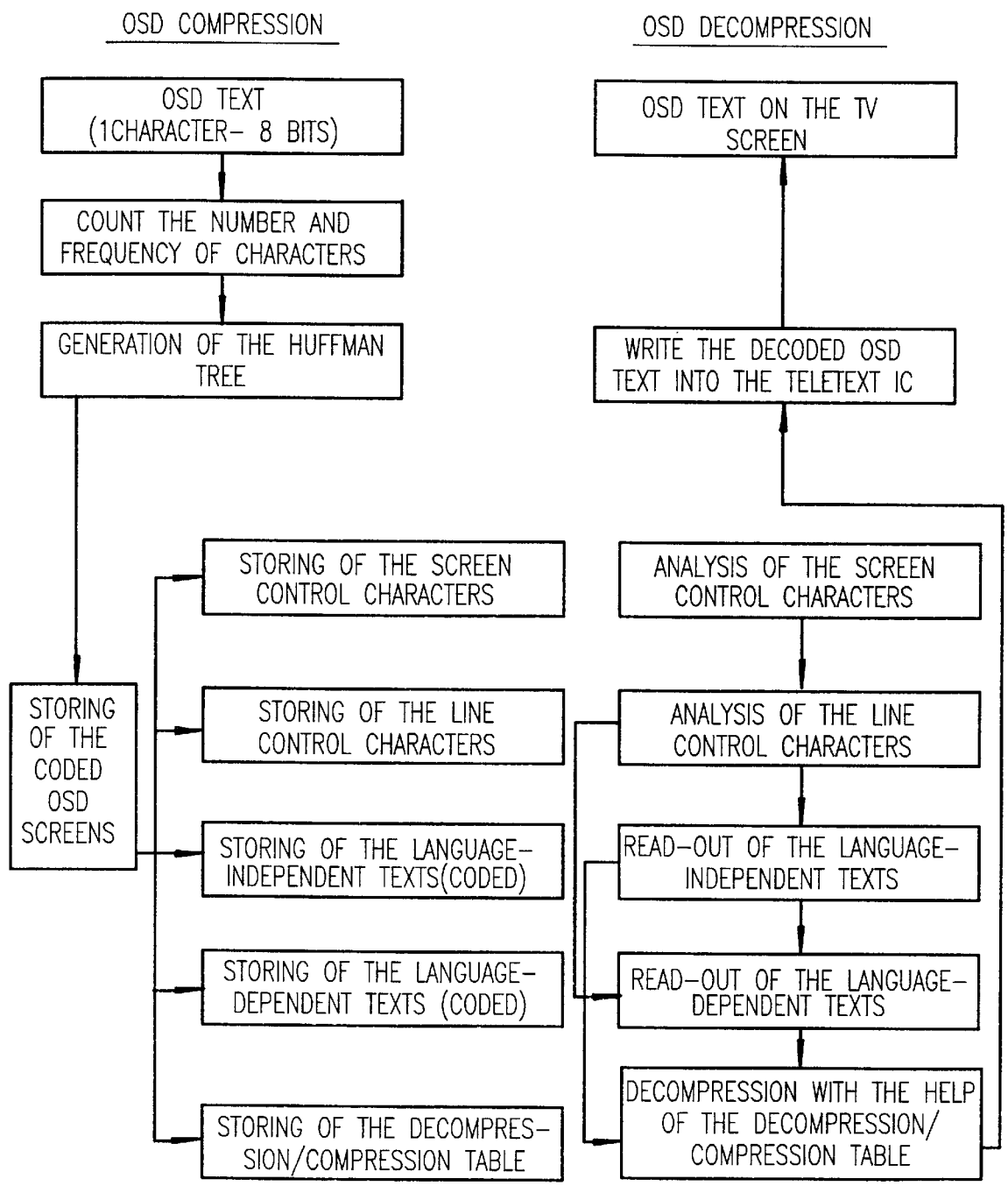
FIG. 1 illustrates a flow chart for the compression and decompression of the videotext.

In FIG. 1, shown as flow chart, the compression of the videotext, which exists in 8-bit digitalized form, is first prepared with the help of a Huffman coding. This takes place by determining the number and frequency of the characters and the generation of a Huffman tree in a manner familiar to the expert. The storing of the thus coded OSD videotexts takes place with simultaneous storing of screen control characters, line control characters, repeated language-independent texts, repeated language-dependent texts, and the compression/decompression table.

The storing, shown in the flow chart, of the screen control characters, the line control characters, the language-independent texts and the language-dependent texts is explained in the following using an example shown in FIG. 2:

In FIG. 2, three screen formats ("screen 1", "screen 2", and "screen 3") are shown, whereby in each case, one or two lines are to be written anew compared to a preceding screen. Thus, in screen 1, line 2 is to be written as "Auto clock setting is failed", in screen 2, lines 4 and 5 are to be written as "MENU: automatic setting" or, respectively, "EXIT: manual setting", and in screen 3, line 5 is to be written as "STORE: setting".

In the memory for the screen control characters ("screen control character array"), under the specific address (e.g., "screen 1") for calling up the respective screen, control bits are stored that contain information on the color of the background, color of the text characters as well as on the type of screen display—as complete image or as window. Furthermore, this array contains a line control record for the five possible lines, in which "0" indicates that the concerned line does not have to be written anew whereas "1" indicates that rewriting of the concerned line is necessary. Thus, the line control record "01000" indicates for screen 1 that the second line must be written anew, as was also indicated above.

The line to be written anew then ensues from the memory of the line control characters ("line control character array") that is addressed from the screen control character array with an address (e.g., "address 1") and displays addresses for language-independent (SU . . . ) and language-dependent (SA . . . ) text portions from which the lines are composed.

Each line begins with the calling up of an address from the language-independent array, since only in the language-independent array is position information contained in the form of column-figures that indicate at what position the line to be written anew in each case begins. For screen 1, the corresponding address is SUX1, which indicates that the concerned line is started in column 6.

The line "Auto clock setting is failed" contained in screen 1 ensues from the addresses SAY1, SAY2 and SAY3, in connection with which SAY1 corresponds to "Auto clock", SAY2 to "setting" and SAY3 to "is failed". The composition from the three language-dependent components took place here because the term "setting" is used often and thus represents a repeatedly recurring component that should not be stored newly coded.

This also results from the composition of lines 4 and 5 in screen 2, where the component "setting" can be called up by the same address SAY2.

In similar manner, screen 3 is composed by rewriting line 5 with the language-independent component "STORE", beginning in column 4 (SUX4) and the language-dependent component "setting" (SAY2).

The distinction made here between language-dependent and language-independent text portions is based on the fact that an operator control, for example for a video-recorder, can be construed in several languages (English, German, French, Swedish in FIG. 2), but that despite the numerous languages, certain phrases occur in the same form in all languages (cf. "MENU", "EXIT" and "STORE" in FIG. 2). Many phrases are language-dependent, on the other hand, and must be separately determined and stored for each language.

The right portion of FIG. 1 shows the decompression of the videotext by analysis of the screen control characters and the line control characters for generating the corresponding videotext, in connection with which the stored language-independent and language-dependent texts are read-out controlled by the stored references and inserted into the texts. In simple form, this succeeds by forming appropriate offsets, in such a way that this text composition—including the Huffman decompression—takes place without problems in "real time". After decompression, the text is present in the typical 8-bit coding and is thus readable by a typical teletext IC that converts the text into suitable control signals for the television screen and thus makes it visible on the screen.

The method according to the invention is distinguished in that a compression rate is obtained that is not immensely high but is significant in practice, and that screen generation through the decompressed data is possible (in "real time") without noticeable delay.

While the invention has been described in terms of a preferred embodiment, those skilled in the art will recognize that the invention can be practiced with modification within the spirit and scope of the appended claims.

We claim:

1. Method for storing and playback of a repertoire of fixed videotext for performing an operator control on a television screen, in which the videotext is stored by characters in digital form in an electrical memory, wherein for forming said videotext of one page position data are stored in a first memory, said position data indicating the position of a text sequence to be formed, addresses for forming said text sequence being stored in a second memory which refer to language independent phrases stored in a third memory and to language dependent phrases stored in a fourth memory, and a separate address is assigned to each of those parts of a text occuring often.

2. Method according to claim 1, wherein the repertoire of fixed videotexts is stored in the form of text sections and an assignment of the text sections belonging to a videotext is stored.

3. Method according to claim 1, wherein for a videotext, only assignments to those text portions that differ from a possible preceding videotext are stored.

4. Method according to claim 1, wherein the characters are stored according to a frequency-oriented bit-length-variable coding to decrease the bits to be stored.

5. Method according to claim 4, wherein a Huffman tree is produced for the bit-length-variable coding.

* * * * *